Apr. 3, 1923. J. C. SETLOW 1,450,232
SUBMARINE SALVAGE VESSEL
Filed March 6, 1920 6 Sheets-Sheet 2

Inventor
John C. Setlow
H.E. Scantlebury
By
Attorney

Apr. 3, 1923.

J. C. SETLOW 1,450,232

SUBMARINE SALVAGE VESSEL

Filed March 6, 1920   6 Sheets-Sheet 3

FIG 4

Inventor
John C. Setlow
H. E. Scantlebury
By
Attorney

Apr. 3, 1923.  
J. C. SETLOW  
1,450,232  
SUBMARINE SALVAGE VESSEL  
Filed March 6, 1920  6 Sheets-Sheet 5

Inventor  
John C. Setlow  
By H. E. Scantlebury  
Attorney

Apr. 3, 1923.

J. C. SETLOW 1,450,232

SUBMARINE SALVAGE VESSEL

Filed March 6, 1920

Inventor
John C. Setlow
By H. E. Scantlebury
Attorney

Patented Apr. 3, 1923.

1,450,232

UNITED STATES PATENT OFFICE.

JOHN C. SETLOW, OF SPOKANE, WASHINGTON.

SUBMARINE SALVAGE VESSEL.

Application filed March 6, 1920. Serial No. 363,653.

*To all whom it may concern:*

Be it known that I, JOHN C. SETLOW, a citizen of the United States, and a resident of Spokane, in the county of Spokane and State of Washington, have invented certain new and useful Improvements in Submarine Salvage Vessels, of which the following is a specification.

This invention relates to improvements in submarine salvage vessels and has for its principal object to provide a device of the class described which may be utilized for salvage work at great depths of water.

In the usual type of submarine salvage vessels, the salvage or wrecking tools are mounted on the exterior of the vessel and are operated from the interior of the vessel. It has therefore been necessary to lead the operating shafts, rods or similar mechanisms for driving and controlling the tools, through stuffing boxes, ball and socket joints or the like provided in the shell of the vessel. Consequently the depth to which salvage vessels have been operated has been limited to comparatively shallow water since the pressure of the water at great depths is sufficient to cause leakage at any point where a working joint is provided between the interior and exterior of the shell regardless of packing measures which may be taken to prevent such leakage.

Therefore it is one of the objects of my invention to increase the working depth of salvage vessels by dispensing with working joints in the side of such vessels by the positioning of electric motors, constituting the operating or driving means for the salvage tools, on the outside of the vessel, and by the positioning of the controlling means consisting of switches, within the vessels. Said controlling means and operating means are connected by electricity conductors, mainly in the form of wires, said conductors at point of entry into the vessel being of novel construction which will preclude the leakage of water into the vessel at this point.

It is a further object of the invention to provide a salvage vessel wherein the salvage tools are of such a character as will enable the operator to perform comparatively intricate tasks with comparative ease.

A further object is to provide a salvage vessel carrying salvage tools in the form of jointed mechanical arms, all movements thereof being performed by electrically operated means positioned on the exterior of the vessel and controlled from the interior of the vessel.

A further object is the provision of means whereby the air pressure within the salvage vessel may be maintained at a desired degree without depending on a supply of air from the surface and without exhausting air into the water.

A further object is the provision of novel means for shifting the position of the vessel when resting on the bottom and a novel means of connecting the vessel and the shifting means.

A further object is the provision of a novel ballast drop, the control thereof being positioned within the vessel while the operating mechanism is without the vessel, the control and operating means being electrically connected.

Further objects of the invention will be more fully described in connection with the accompanying drawings and more particularly pointed out in and by the appended claims.

In the drawings.

Like numerals of reference designate similiar parts throughout the various figures of the drawings.

As illustrated, 10 designates the shell or hull of the vessel and is preferably cylindrical in shape and its structure may be designed so as to withstand the extreme water pressure of great depths without collapsing.

The shell 10 may be lowered or raised from an attending ship by means of the cables 11 which are fastened to the top of shell 10 by means of eyes 12.

A man hole 13, through which access may be gained to the interior of shell 10, is provided with the water tight manhole cap 14 (Fig. 5) which is held in position by bolts 15. In order to render cap 14 water tight, I preferably introduce gaskets 16 between the cap 14 and the shell 10.

Figure 1:
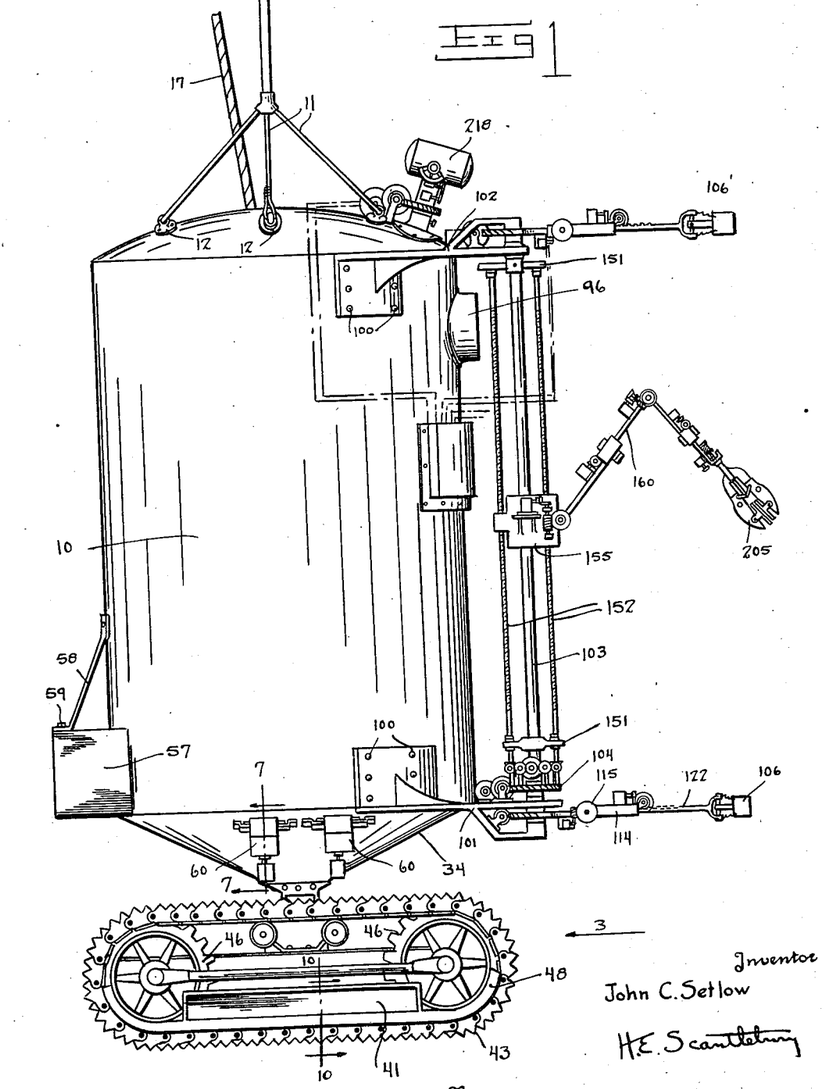
Figure 1 is a side elevation of the salvage vessel.
Figure 2:
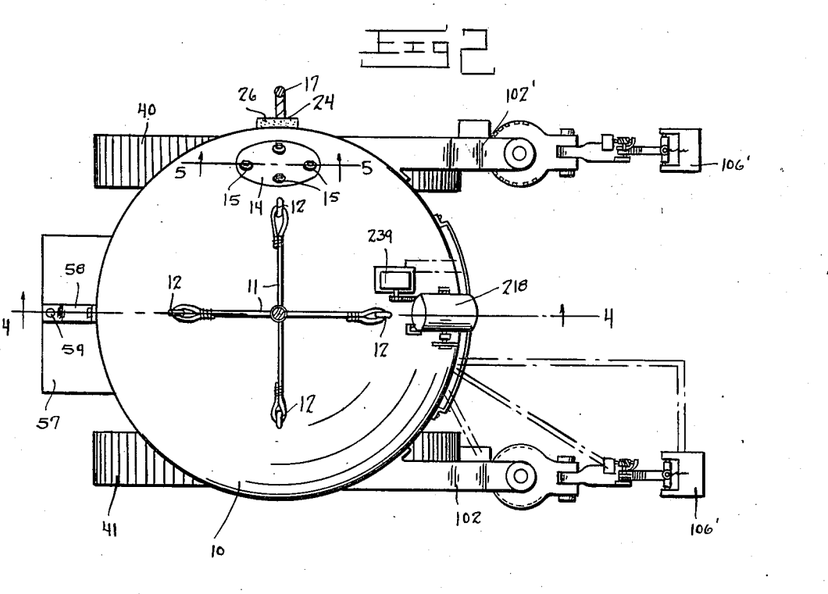
Figure 2 is a top, plan view of Figure 1.
Figure 3:
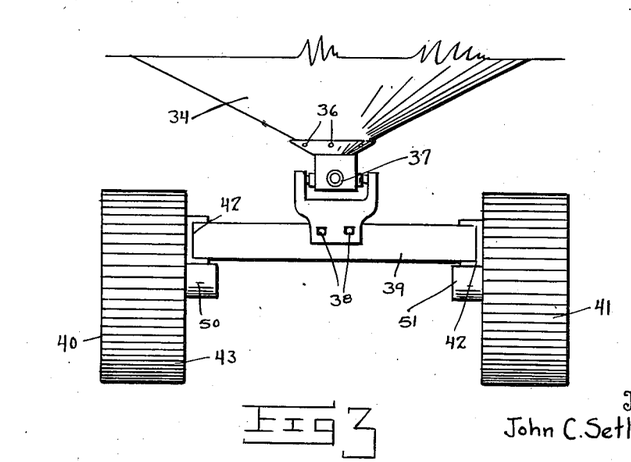
Figure 3 is a view of the connection between the shell of the vessel and the tractor drive, looking in the direction of arrow 3, Figure 1.
Figure 4:
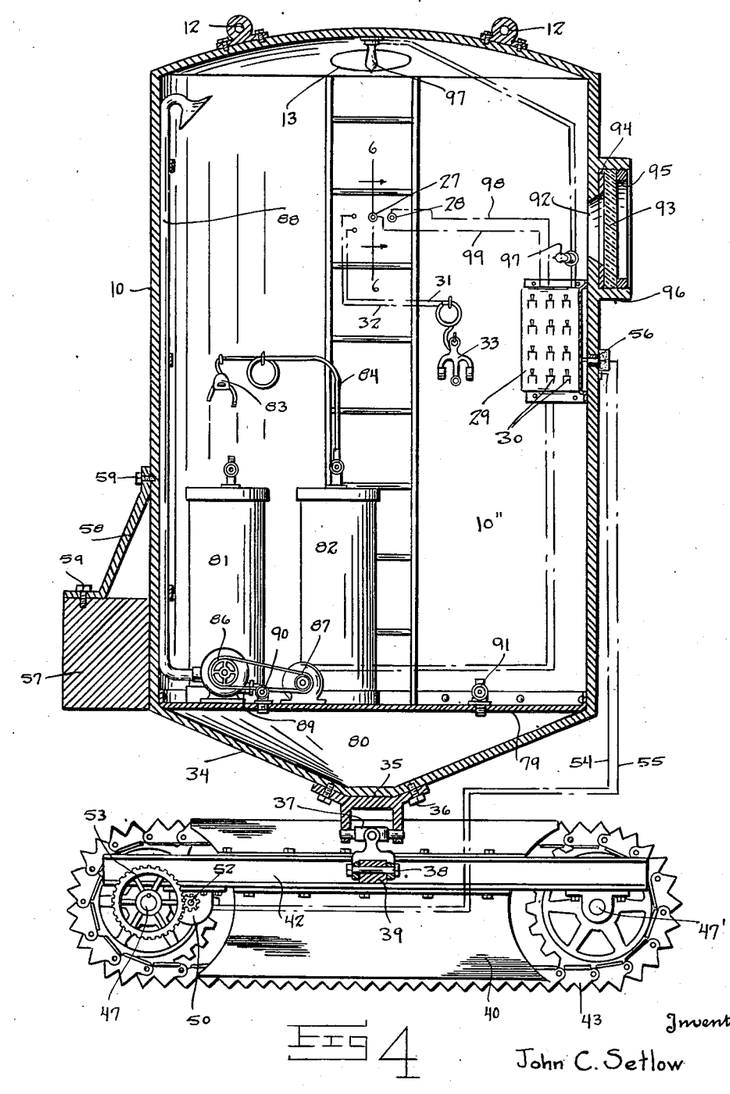
Figure 4 is an enlarged section of the shell and tractor drive on line 4—4 of Figure 2.
Figures 5, 6, 7, 8, 9, 10, 20:
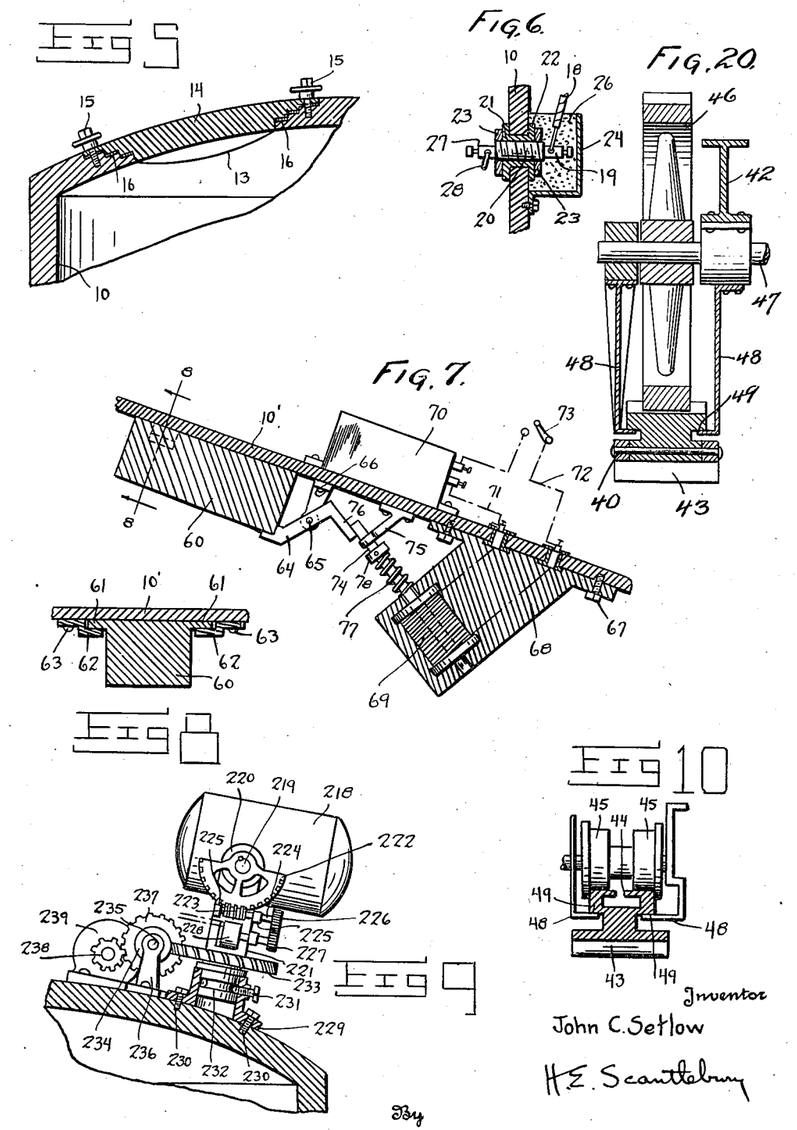
Figure 5 is an enlarged section on line 5—5 of Figure 2.
Figure 6 is an enlarged section on line 6—6 of Figure 4.
Figure 7 is an enlarged section on line 7—7 of Figure 1.
Figure 8 is a section on line 8—8 of Figure 7.
Figure 9 is a partial sectional view showing the search light and means of connecting same to the top of the vessel.
Figure 10 is an enlarged section on line 10—10 of Figure 1.
Figure 20 is a vertical section view through shaft 47 in Figure 4.

A cable 17 furnishes the necessary light, power and telephone connection between the attending ship and the interior of shell 10 and I have provided a novel means of carrying electricity from cable 17 through the side wall of shell 10 whereby there will be no danger of water leakage into the shell 10 at this point. In Figure 6 I have shown one of the wires 18 from cable 17 attached to binding post 19 carried on the extremity of plug 20 which passes entirely through the shell 10 and is insulated therefrom at 21. Plug 20 is threaded through the insulation 21 which is flanged as at 22 to hold it in position with respect to the shell 10.

Lock nuts 23 further serve to position plug 20 with respect to insulation 21 and shell 10. A metal casing 24 covers binding post 19 and is secured to shell 10 by bolts 25. After wire 18 has been secured to binding post 19, the casing 24 is filled with an insulating cement 26 which will harden and set and which will resist the action of water. Inasmuch as there is no movement on the part of the plug 20, it will be seen that cement 26 will serve not only to insulate binding post 19 but will also seal the entire joint between the shell and plug 20 and that the external pressure of the water will have no effect on the joint.

On the opposite end of plug 20, which is an electricity conductor, and within the shell 10, is arranged the binding post 27 to which is attached wire 28 leading to the switch board 29. It will be understood that each wire such as 30, 31, 32 contained in cable 17 will be electrically connected with the interior of the shell in the manner just described in connection with wire 18. Wires 27—28, which are the main power and light wires, are connected to switch board 29 and the electricity conveyed thereby is thence distributed to the various power appliances, to be described, through the medium of control switches 30.

As a means of communicating with the surface, I have shown a head clamp telephone set at 33 connected to telephone wires 31—32 which are carried to the surface by cable 17.

The lower end of shell 10 is conical in shape as at 34 and to the extremity 35, thereof, is attached by bolts 36 the universal joint 37. Joint 37 is secured at 38 to the cross beam 39 which ties together the tractor members 40—41. Tractor members 40—41 are of any suitable type but for sake of illustration I have shown them as comprising the supporting frames 42, treads 43, track 44 (Fig. 10) rollers 45, sprockets 46 mounted on shafts 47 and 47′ and track positioning members 48. The treads 43, tracks 44, rollers 45 and positioning members 48 may be arranged as shown in Figure 10, the positioning members 48 supporting treads 43 by contact with shoulders 49 to prevent treads 43 from dropping away from rollers 45 while said treads 43 are raised from the surface of the ground. Tractor members 40 and 41 are driven by independent motors 50—51 which are operatively connected with shafts 47 by such means as spur gears 52 and gears 53.

Motors 50—51 are electrically connected with switch board 30 by such means as wires 54—55, there being an independent circuit for each motor 50—51. The motors 50—51 are reversible and are of that type, (such as squirrel cage, induction) which will operate freely and well although entirely immersed in water. The wires 54—55 are insulated with any suitable material which will resist the action of fresh or salt water. The point of entry 56 of wires 54—55 into the shell 10 may be constructed exactly similar to that construction described in connection with the method of introducing wires from cable 17 into the interior of shell 10.

It will be understood that all motors and wires positioned on the exterior of shell 10 and all connections between said wires and the interior of shell 10 hereafter mentioned in connection with the device will be of the type described immediately above.

By driving tractor members 40—41 through motors 50—51 it will be seen that after the vessel touches bottom it may be maneuvered about to bring it into advantageous position with respect to the wreck or material on which work is to be done. By operating motors 50—51 independently it will be seen that the vessel may be readily steered.

Due to the universal joint 37, the tendency of the shell 10 will be to remain upright even though the tractor members 40—41 may be resting on un-even ground. To offset the weight of the external working apparatus (to be described) I have secured a counter-weight 57 to shell 10 by means of brace 58 and bolts 59.

As a means of lowering the vessel to depths beyond which the weight of the shell 10 and its attachment would lower it, I have provided ballast in form of weights 60, (Figs. 1–7 and 8). Weights 60 may be provided in any desired number although I have shown but two for purposes of illustration. Weights 60 are so secured and the securing means is so controlled that the weights may be dropped when it is desired to raise the vessel.

Said means are such that they are controlled from the inside of the vessel and yet no working joint in the shell 10 is needed.

Referring to Figures 7–8, it will be seen that weights 60 are held against the underside 10' of the shell 10 by means of short flanges 61 on weights 60, brackets 62 supporting said flanges 61 and secured to bottom 10' at 63, and the lever 64 which is pivotally supported from bottom 10' at 65 by bracket 66.

Secured to bottom 10' at 67 is the casing 68 containing the solenoid 69 which is electrically connected to storage battery 70 by wires 71—72, and switch 73. Armature 74, adapted to slide within the bore of solenoid 69 and the bracket 75, is normally held in the path of the upper end 76 of lever 64 by means of expansive spring 77 interposed between casing 68 and the collar 78, the latter being secured to armature 74. When in the position of Figure 7 (the solenoid 69 being now demagnetized) armature 74 will hold lever 64 in the position shown, thereby retaining weight 60 against the force of gravity. Upon it being desired to release weight 60, solenoid 69 is energized by closing switch 73, whereupon armature 74 will be retracted sufficiently to free end 76 of lever 64, thereby allowing weight 60 to slide downwardly by swinging lever 64 in a counter-clockwise direction. As soon as weight 60 has slid far enough down to clear flanges 61 from brackets 62, weight 60 will drop clear of the vessel. The purpose of energizing solenoid 69 from storage battery 70 instead of from the electricity conveyed by cable 17 is to make the ballast release independent of power supplied from the surface of the water. If the release were dependent upon such power and such power unavoidably cut off, the operator within the vessel would be powerless to free weights 60 and it is at just such a time that he would be most desirous of aiding the vessel in returning to the surface of the water.

I will now describe my means for supplying oxygen to the occupants of the vessel and also for maintaining the air pressure within the vessel at the desired degree.

A false bottom 79 is secured to the side walls of shell 10 and is so arranged as to divide the shell 10 into a working chamber 10'' and an air tight compartment 80. Resting on bottom 79 are the oxygen tanks 81 and 82, supplied in any desired number which may conveniently be accommodated within the chamber 10''. A breathing apparatus 83 is adapted to be strapped to the face of the workmen within the vessel and may be attached by tubing 84 to any of the oxygen tanks. Thus, workmen within the vessel may be supplied with oxygen without depending on a supply of air from the surface, the flow of oxygen being properly regulated by valve 85.

Should it be desired to raise the pressure within chamber 10'', any of the extra tanks of compressed oxygen may be opened to allow a flow into said chamber. Should it be desired to lower the pressure within the chamber 10'', pump 86, driven by motor 87 will be started, thereby drawing air from the chamber 10'' through pipe 88 and valve 90 into the compartment 80. As soon as the pressure is sufficiently reduced, valve 90 is closed and the pump stopped. Later, on rising to the surface, the air within compartment 80 may be released by opening valve 91. By the provision of compartment 80, it will be seen that excess air within the working chamber 10'' of the vessel may be taken from said chamber 10'' without an exhaust connection to the exterior of the vessel.

As a means for allowing the workmen within the vessel to peer out into the water I have provided the observation port 92, which is glassed over as at 93. In order to make port 92 water tight I have interposed a gasket 94 between the exterior of shell 10 and the glass 93 and provided an annular, externally threaded ring 95 which is adapted to press glass 93 inwardly by its threaded connection with the internally threaded flange 96 which may be made integral with shell 10.

In order to light the interior of the shell 10, I have provided the electric light globes 97 which are connected to switch board 29 by wires 98—99.

Extending laterally from the shell 10 and secured thereto by bolts 100 are the lower brackets 101 and the upper brackets 102 and 102'. Inasmuch as the apparatus carried by the two sets of brackets are similar in constructure a description of one will suffice.

Journaled within the brackets 101—102 is the vertically arranged shaft 103, positioned vertically by the hub of worm gear 104 secured to said shaft 103 at 105.

As a means for holding the vessel at a predetermined distance from the steel hull upon which it may be working, I have provided the magnet head 106 which is in the form of an electro-magnet energized by wires 107 leading to switch board 29. Head 106 is adjustably secured to shaft 103 by the following means. Plate 108 is loosely journaled on shaft 103 and is provided with the worm gear segment 109 adapted to be operatively connected to motor 110 by worm 111 and shaft 112. Motor 110 is electrically connected to switch board 29 and the revolving of said motor will swing plate 108 either in clockwise or counter clockwise direction in Figure 12. Journaled in plate 108 is the shaft 113 to which is secured arm 114 and worm gear 115. Gear 115 is operatively connected to motor 116 by worm 117, shaft 118, and bevel gears 119—120. Motor 116 is electrically connected to switch board 29 and serves to swing arm 114 in a clockwise or counter clockwise direction in Figure 11.

Arm 114 is cored out as at 121 to serve as a guide for rod 122 which is provided with rack 123. A spur gear 124 is carried on shaft 125 which is journaled in brackets 126 secured to arm 114. Gear 124 meshes with rack 123 and is operatively connected to a motor 127 by shaft 125, worm gear 128 fast on said shaft, and worm 129 on shaft 130 which is journaled in brackets 131 on arm 114. Motor 127 is electrically connected to switch board 29 and operation of said motor will revolve gear 134 which by its engagement with rack 123 will extend or retract rod 122 with respect to arm 114. Magnet head 106 is secured to rod 122 by universal joint 132 and equalizing springs 133.

After shell 10 has been placed in correct position with relation to the hull on which it is working, the various motors 110, 116, 127 will be operated until the head 106 contacts with a suitable metallic portion of the hull and head 106 will then be magnetized to hold it to the hull and hence retain the shell 10 in the given position with relation to the hull. The worm connections between the various joints will prevent any tendency of the various arms and rods to change position, in other words, they serve as a lock.

A plurality of magnet heads 106 may be provided on each set of brackets and, for purpose of illustration, I have shown one at 106' which will be similar in construction to that just described.

Figures 11, 13, 14:
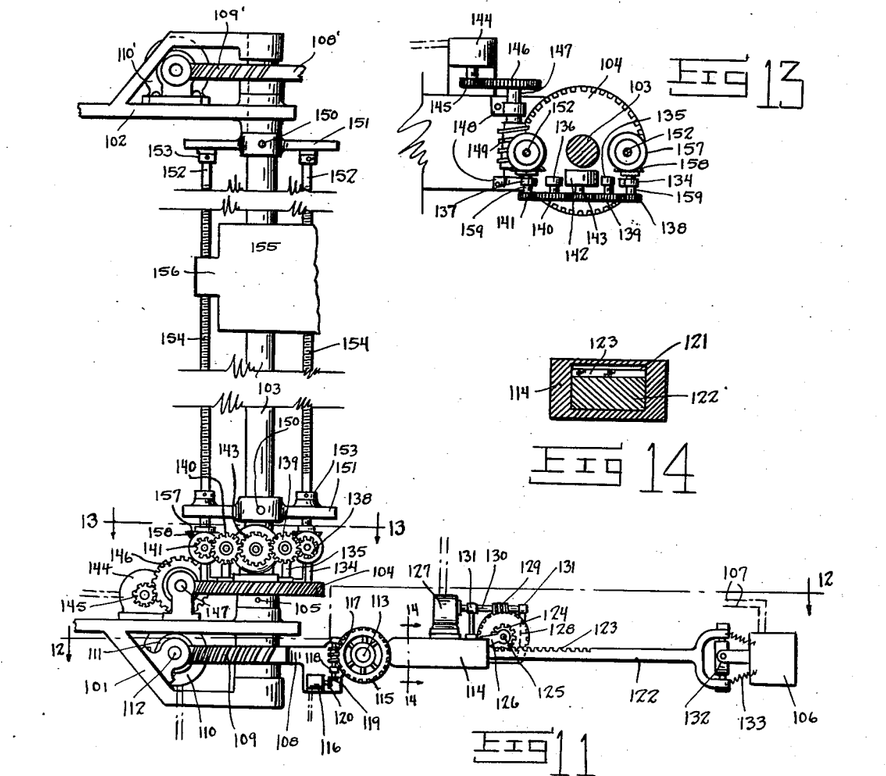
Figure 11 is a view in side elevation showing the construction of the magnet holding means and the method of mounting same on the shell.
Figure 13 is a section on line 13—13 of Figure 11.
Figure 14 is an enlarged section on line 14—14 of Figure 11.
Figure 12:
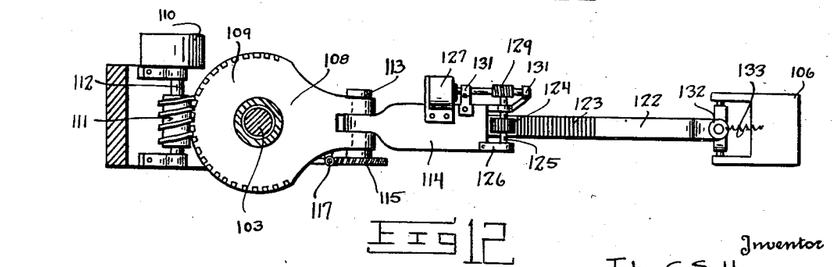
Figure 12 is a section on line 12—12 of Figure 11.

Referring to Figures 11–13, worm gear 104 is shown as carrying journals 134, 135, 136 and 137, which support suitable shafts carrying gears 138, 139, 140 and 141. Gears 138 and 139 are adapted to mesh together, as are also gears 140—141. Motors 142, carried on the upper face of gear 104 and electrically connected to switch board 29 drives gear 143 which is adapted to mesh with gears 139—140.

A motor 144, supported on bracket 101 and electrically connected to switch board 29, is operatively connected with worm gear 104 by gear 145, gear 146 on shaft 147 which is journaled in brackets 148, and worm 149, fast on shaft 147. Motor 144, when revolved, will through its operative connection with worm gear 104, serve to revolve shaft 103 and all apparatus secured thereto.

Figures 15, 17, 18, 19:
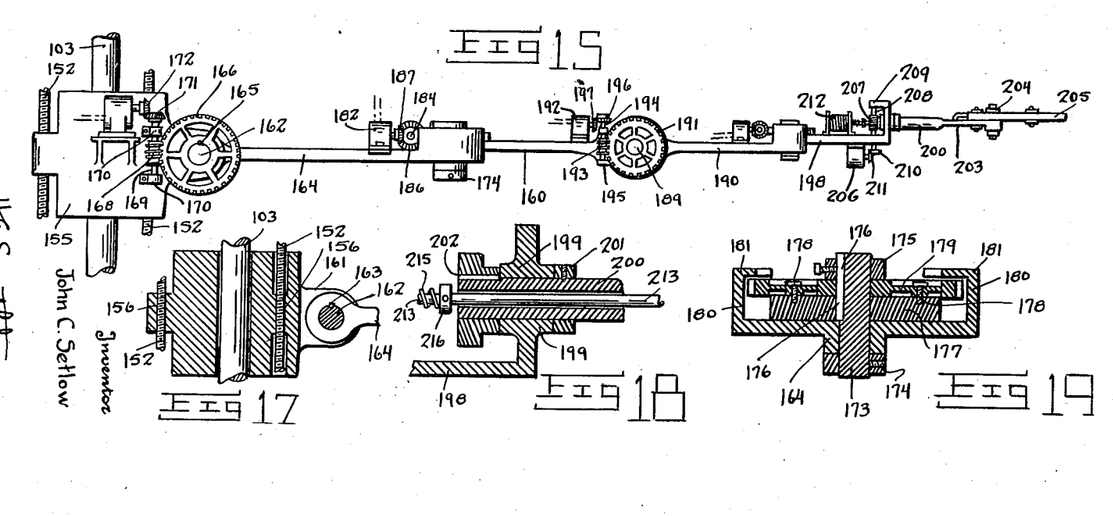
Figure 15 is a side elevation of one of the mechanical arms.
Figure 17 is a section on line 17—17 of Figure 16.
Figure 18 is an enlarged section on line 18—18 of Figure 16.
Figure 19 is enlarged section on line 19—19 of Figure 16.

Pinned to shaft 103 at 150 are rod supporting members 151 through which are journaled the ends of rods 152, positioned vertically by collars 153. Intermediate their ends, the rods 152 are threaded as at 154 for threadable engagement with the carriage 155 at 156 (Fig. 17).

To the lower extremities of rods 152 are secured the bevel gears 157 meshing with the bevel gears 158 carried on shafts 159 which support gears 138—141. The revolving of motor 142 will, through gears 143, 139, 140, 138, 141, 159 and 158, revolve rods 152 and consequently raise or lower the carriage 155.

I will now describe in detail the mechanical arms generally indicated at 160, reference being had particularly to Figures 15 to 19, inclusive.

Carriage 155 carries journals 161 within which is journaled the shaft 162. Keyed at 163 to shaft 162 is arm section 164, and keyed at 165 is the worm gear 166. Worm gear 166 has operative connection with motor 167 through worm 168 on shaft 169 which is supported on carriage 155 by journals 170, and bevel gears 171—172. Motor 167 is supported on carriage 155 and has electrical connection with switch board 29. Motor 167, through its operative connection therewith, serves to swing arm section 164 in a clockwise or counter clockwise direction (Fig. 15).

Journaled near the extremity of arm section 164 is the shaft 173 (Fig. 19) which is positioned vertically by set collars 174—175. Keyed at 176 to shaft 173 is the arm section 177 the lower face of the extremity of which is adapted to bear on the upper face of section 164. Keyed to shaft 173 at 176' and bolted to section 177 at 178 is the worm gear 179. Flanges 180 are brought up from section 164 and bent over the top of gear 179 as at 181 to aid in carrying the weight of section 177.

Gear 179 is operatively connected with a motor 182 by worm 183 carried on shaft 184 journaled at 185 to section 164, and bevel gears 186–187. Motor 182 is secured to section 164 and has electrical connection with switch board 29. Motor 182 serves to swing section 177 in a clockwise or counterclockwise direction in Figure 16.

Arm section 177 is forked as at 188 to journal the shaft 189 to which is secured the arm section 190 and worm gear 191. Gear 191 has operative connection with motor 192 through worm 193 carried on shaft 194 which is journaled to arm section 177 at 195, and bevel gears 196—197. Motor 192 is secured to section 177 and has electrical connection with switch board 29. Motor 192 serves to swing section 190 in a clockwise or counter clockwise direction in Figure 15.

An arm section 198 is connected to arm section 190 by means similar to those used in connecting section 177 to section 164 and will therefore not be described in detail. Parts similar in construction have been indicated on the drawings with corresponding primed numerals.

Figure 16:
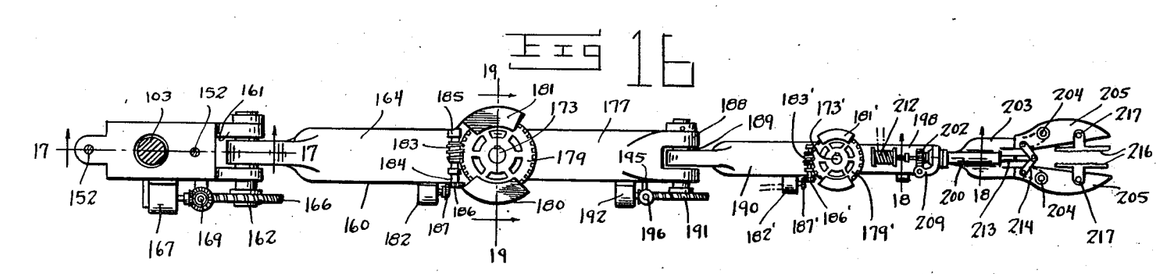
Figure 16 is a top, plan view of Figure 15.

Referring particularly to Figures 15, 16 and 18, it will be seen that the extremity of section 198 is bent upwardly to form journal 199. A hollow shaft 200 is journaled within 199 and is laterally positioned by collar 201 and worm gear 202 secured thereto on opposite sides of journal 199. Shaft 200 carries the forked plate 203 to which are pivoted at 204 the jaws 205. Gear 202 is operatively connected to motor 206 by worm 207 carried by shaft 208 which is journaled at 209 to section 198, and bevel gears 210—211. Motor 206 is secured to section 198 and is electrically connected with switch board 29. Motor 206 serves, through its operative connections just described, to revolve shaft 200 and all mechanism carried thereby. This movement will be especially useful in bolting or unbolting, by first clamping jaws 205 on the bolt or nut to be turned.

I have provided a novel means for adjusting jaws 205 irrespective of the revolving movement which may be imparted to said jaws. A solenoid 212 is secured on section 198 and electrically connected to the switch board 29. Adapted to slide within the bore of solenoid 212 is the armature 213, which extends through hollow shaft 200. The extremity of armature 213 is attached to jaws 205 by means of links 214.

An expansive spring 215 is slipped over armature 213 and interposed between the end of the solenoid 213 and a collar 216 secured to armature 213. Spring 215 will normally thrust armature 213 to the right and, through links 214 and the pivotal mounting of jaws 205, will hold jaws 205 open, as in Figure 16.

When solenoid 212 is energized through switch board 29, armature 213 will be drawn to the left, and, through links 214, will close jaws 205, causing them to grasp any object which may lie there-between.

To make the jaws more effective I may add the serrated gripping plates 216 which are pivoted to jaws 205 at 217 and give a parallel jaw effect.

In de-energizing solenoid 212, spring 215 will serve to open jaws 205.

It will be seen that due to the jointed sections making up the mechanical arms 160, it is possible to project the jaws 205 into cramped quarters and into almost in-accessible places, without eliminating the jaws' usefulness. After the jaws have been clamped on an object it will be possible to handle the object in almost any conceivable manner by properly manipulating the arms 160. At all times, the arms will remain in the position taken when the operating motors are stopped, due to the worm drive used in connection with each joint.

In order that light may be directed at the object on which work is being performed, I have provided the search light 218 (Figs. 1–9) and have shown means whereby the search light may be swung into various positions by motor means positioned on top of the shell 10. Search light 218 is secured to shaft 219 which is journaled to the forked extremity 220 of vertical shaft 221. Shaft 219 carries a worm gear segment 222 which is adapted to engage worm 223 which is carried on shaft 224, the latter being journaled to upright 221 at 225. A gear 226 secured to shaft 224, meshes with gear 227 which is adapted to be revolved by motor 228. It will be seen that motor 228, through its operative connection with shaft 219 serves to swing search light 218 up or down.

Upright shaft 221 extends downwardly into bearing relation with journal 229 which is secured to the top of shell 10 at 230. Set screw 231 projecting into the annular groove 232 provided in shaft 221 serves to hold said shaft from being accidentally raised free of journal 229. Shaft 221 carries the worm gear 233 which is adapted to mesh with worm 234 carried on shaft 235 which is journaled to hangers 236. Shaft 235 carries gear 237 adapted to mesh with gear 238 carried by motor 239. Motor 239 is mounted on the top of shell 10 and is electrically connected with switch board 29.

Motor 239, by its operative connection with shaft 221, serves to revolve search light 218, at will.

While I have herein shown and described one embodiment of my invention, I do not wish to be limited thereto, except for such limitations as the claims may import.

What I claim is:—

1. In a submarine salvage vessel, a water tight shell, tractor devices positioned beneath said shell for maneuvering said vessel while resting on bottom, a universal joint connecting said tractor devices to said shell to enable said shell to remain upright in the water when said tractor devices are resting on uneven bottom, electric motors operatively connected to said tractors to drive same, means for conveying electricity to said motors, and means positioned within said shell for controlling the flow of electricity to said motors.

2. In a submarine vessel, a water tight shell, ballast detachably secured to the exterior of said shell, means positioned on the exterior of said shell to normally retain said ballast secured to said shell, electrically operated means positioned on the exterior of said shell to release said ballast from said shell and means for controlling said last mentioned means positioned within said shell.

3. In a submarine salvage vessel, a water tight shell, brackets secured to the exterior of said shell, a shaft journaled in said brackets, a plate journaled on said shaft, a magnet head, means for magnetizing said head, means within said shell for controlling the magnetizing of said head, electric motor driven means for revolving said plate, jointed connections between said plate and said head, means adapted to actuate said jointed connections to laterally and vertically shift the position of said head with respect to said shell.

4. In a submarine vessel, ballast detachably secured exteriorly thereof, a lever disposed in the path of said ballast, a solenoid, an armature adapted to be acted upon by the energization of said solenoid and co-acting with said lever, spring means for retaining said armature in a pre-determined position with respect to said lever when said solenoid is de-energized whereby said ballast is retained in position on said vessel, and means for energizing said solenoid whereby said armature is drawn out of co-acting relation with said lever to allow said weight to thrust said lever out of its path and to free itself from attachment to said vessel.

5. In a submarine salvage vessel, a water tight shell, a partition dividing the interior of said shell into two compartments, one a working compartment and the other an air storage compartment, storage means for carrying oxygen under pressure for admission to said working compartment, a pump within said working compartment and means to drive said pump to draw air from said working compartment and to force it under pressure into said storage compartment.

6. In a submarine salvage vessel, a water tight shell, a partition dividing the interior of said shell into a working compartment and a storage department, self contained means within said shell adapted to maintain a supply of life sustaining atmosphere at a pre-determined pressure within said working compartment, said means comprising a container positioned within said working compartment and carrying a supply of oxygen under pressure, means for allowing said oxygen to flow from said tank into said working compartment, and a pump within said working compartment adapted to draw air from said working compartment and to force it into said storage compartment whereby the pressure within said working compartment is reduced.

7. In a submarine salvage vessel, a water tight shell, driving devices positioned beneath and exteriorly of said shell, and a single jointed connection between said driving devices and said shell whereby the buoyancy of said shell causes said shell to remain upright when submerged irrespective of the nature of the bottom on which said driving devices rest.

8. In a submarine salvage vessel, a cylindrical shell having a conical bottom, driving devices positioned beneath and exteriorly of said shell, and a universal joint connecting the apex of said conical bottom and said driving devices.

9. In a submarine salvage vessel a cylindrical shell, a conical bottom on said shell, a partition disposed interiorly of said shell to divide the interior of said vessel into a working compartment and a compartment for the reception of excess air from said working compartment, and driving devices having jointed connection with said conical bottom.

10. In a submarine salvage vessel, mechanical arms secured to the exterior of said vessel, gripping jaws pivotally arranged on said arms, solenoids on said arms, armatures co-acting within said solenoids and operatively connected to said jaws whereby energization of said solenoids retracts said armatures to close said jaws, means for energizing said solenoids, means within said vessel for controlling the energization of said solenoids, and means for normally retaining said jaws in an open position when said solenoids are de-energized.

11. In a submarine salvage vessel, mechanical arms secured to the exterior of said vessel, gripping jaws pivotally arranged on said arms, means for revolving said jaws with respect to said arms, solenoids on said arms, armatures co-acting within said solenoids and operatively connected to said jaws whereby energization of said solenoids retracts said armatures to close said jaws, means for energizing said solenoids, means within said vessel for controlling the energization of said solenoids, and means for normally retaining said jaws in an open position when said solenoids are de-energized.

12. In combination with a submarine vessel, a mechanical arm positioned exteriorly of said vessel and connected thereto, a hollow shaft journaled on the extremity of said arm, means on said arm for revolving said shaft, a plate secured to said shaft, gripping jaws pivoted on said plate, a solenoid on said arm, an armature coacting with said solenoid and operatively connected to said jaws, said armature passing through the center of said shaft whereby longitudinal movement of said armature and revolving movement of said shaft may be caused simultaneously or selectively.

13. In combination with a submarine vessel, a jointed mechanical arm made up of sections and secured to the exterior of said vessel, gripping jaws on said arm, worm gear connections between said sections, motors operatively connected to said worm gear connections, means for driving said motors whereby said worm gear connections cause relative movement between said sections, said worm gear connections being adapted to retain said arm sections in predetermined relation with each other when said motors are at rest, and means within said vessel for controlling said motors.

14. In combination with a submarine vessel, a mechanical arm secured to the exterior of said vessel, said arm comprising arm sections, shafts pivotally connecting said sections, worm gears on said shafts, worms on said sections engaging said worm gears whereby the revolving of said worms causes relative movement of said arm sections with respect to each other at the points of their shaft connections, means positioned exteriorly of said vessel adapted to revolve said worms, said means comprising motors operatively connected to said worms, means within said vessel adapted to drive said motors, and a connection between said last mentioned means and said motors passing through the walls of said vessel and non-movable with respect to said walls, to carry the power from said last mentioned means and deliver it to said motors.

15. In combination with a submarine vessel, a shaft secured to the exterior of said vessel, a mechanical arm slidably mounted on said shaft and means for elevating and lowering said arm with respect to said shaft, said means comprising threaded rods extending substantially parallel to said shaft, said arm being internally threaded to co-act with said threaded rods, a motor operatively connected to said rods and adapted to revolve said rods, and means positioned within said vessel for driving said motor.

In testimony whereof, I hereby affix my signature.

JOHN C. SETLOW.